(12) United States Patent
Heieis et al.

(10) Patent No.: US 11,364,807 B2
(45) Date of Patent: Jun. 21, 2022

(54) CONTACT UNIT

(71) Applicant: SCHUNK TRANSIT SYSTEMS GMBH, Wettenberg (DE)

(72) Inventors: Nils Heieis, Lich (DE); Matthias Domes, Bad Nauheim (DE); Timo Staubach, Herbstein (DE); Peter Schneider, Fronhausen (DE)

(73) Assignee: SCHUNK TRANSIT SYSTEMS GMBH, Wettenberg (DE)

( * ) Notice: Subject to any disclaimer, the term of this patent is extended or adjusted under 35 U.S.C. 154(b) by 15 days.

(21) Appl. No.: 16/979,721

(22) PCT Filed: Mar. 12, 2019

(86) PCT No.: PCT/EP2019/056154
§ 371 (c)(1),
(2) Date: Sep. 10, 2020

(87) PCT Pub. No.: WO2019/175166
PCT Pub. Date: Sep. 19, 2019

(65) Prior Publication Data
US 2021/0039511 A1    Feb. 11, 2021

(30) Foreign Application Priority Data
Mar. 15, 2018   (DE) ...................... 10 2018 106 047.5

(51) Int. Cl.
*B60L 53/10*   (2019.01)
*B60L 53/16*   (2019.01)
*H01R 13/631*  (2006.01)

(52) U.S. Cl.
CPC .............. *B60L 53/11* (2019.02); *B60L 53/16* (2019.02); *H01R 13/631* (2013.01); *B60L 2200/18* (2013.01)

(58) Field of Classification Search
CPC ...... B60L 53/11; B60L 53/16; B60L 2200/18; B60L 5/42; B60L 53/14; B60L 53/35;
(Continued)

(56) References Cited

U.S. PATENT DOCUMENTS 5,495,159 A     2/1996  Shiraishi
2014/0070767 A1* 3/2014  Morris .................... B60L 53/16
                                                       320/109
(Continued)

FOREIGN PATENT DOCUMENTS

DE            3610455 A1   10/1987
DE       202015100623 U1    5/2016
(Continued)

*Primary Examiner* — Paul Dinh
(74) *Attorney, Agent, or Firm* — Dickinson Wright PLLC; Andrew D. Dorisio

(57) ABSTRACT

The invention relates to a contact unit (24) for a fast charging system for electrically driven vehicles, in particular electric busses or the like, the fast charging system comprising a charging contact device and a contact device having a contact unit carrier, the contact unit carrier having the contact unit, a charging contact of the charging contact device being electrically connectable to the contact unit to form a contact pair, the contact device or the charging contact device comprising a positioning device, the contact unit carrier being positionable relative to the charging contact device by means of the positioning device in such a manner that an electrically conductive connection is formed between a vehicle and a stationary charging station, the contact unit comprising a contact element (25), the contact unit having a connecting lead for being connected to the vehicle or the charging station, the contact element being mounted on a pivot bearing (26) of the contact unit so as to be pivotable relative to the contact unit carrier.

24 Claims, 4 Drawing Sheets

Figure 1:
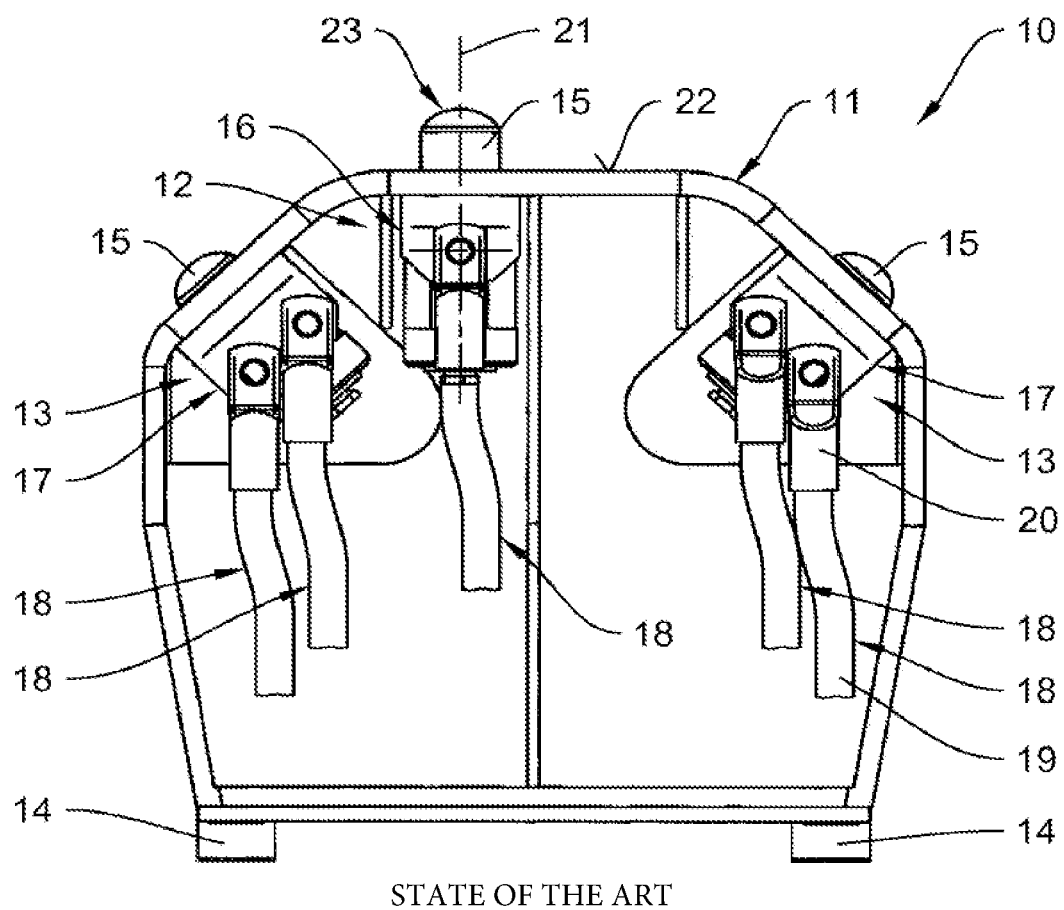

(58) Field of Classification Search
CPC . B60L 5/36; B60L 5/24; H01R 13/631; Y02T 10/70; Y02T 10/7072; Y02T 90/12; Y02T 90/14; B60Y 2200/143; B60Y 2200/91
USPC .......................................................... 320/109
See application file for complete search history.

(56) References Cited

U.S. PATENT DOCUMENTS

| | | | | |
|---|---|---|---|---|
| 2016/0023564 A1* | 1/2016 | Warner | ................... | B60L 53/11 320/109 |
| 2016/0167532 A1* | 6/2016 | Weigel | ................... | B60L 53/11 320/109 |

FOREIGN PATENT DOCUMENTS

| | | |
|---|---|---|
| EP | 3141417 A2 | 3/2017 |
| JP | S62126095 A | 6/1987 |
| JP | S63202202 A | 8/1988 |
| JP | H08308023 | 11/1996 |
| WO | WO2015018887 A1 | 2/2015 |

* cited by examiner

STATE OF THE ART

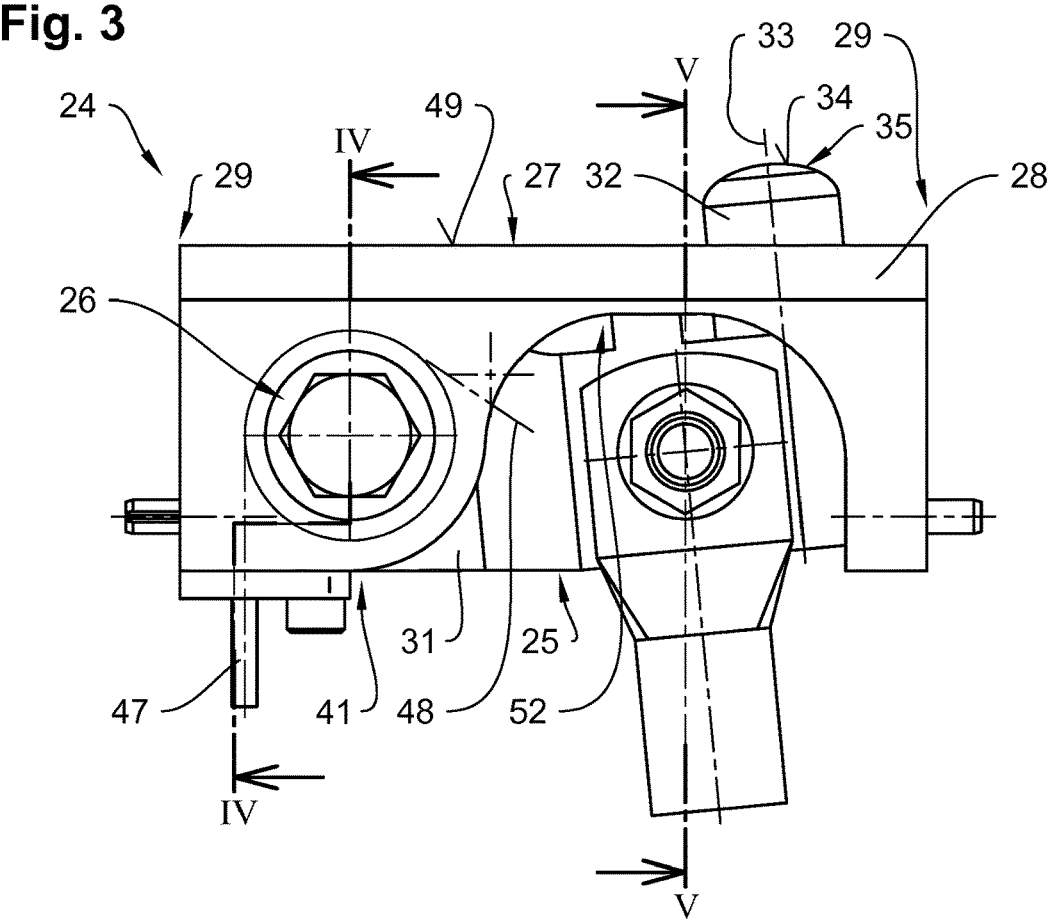
Fig. 3
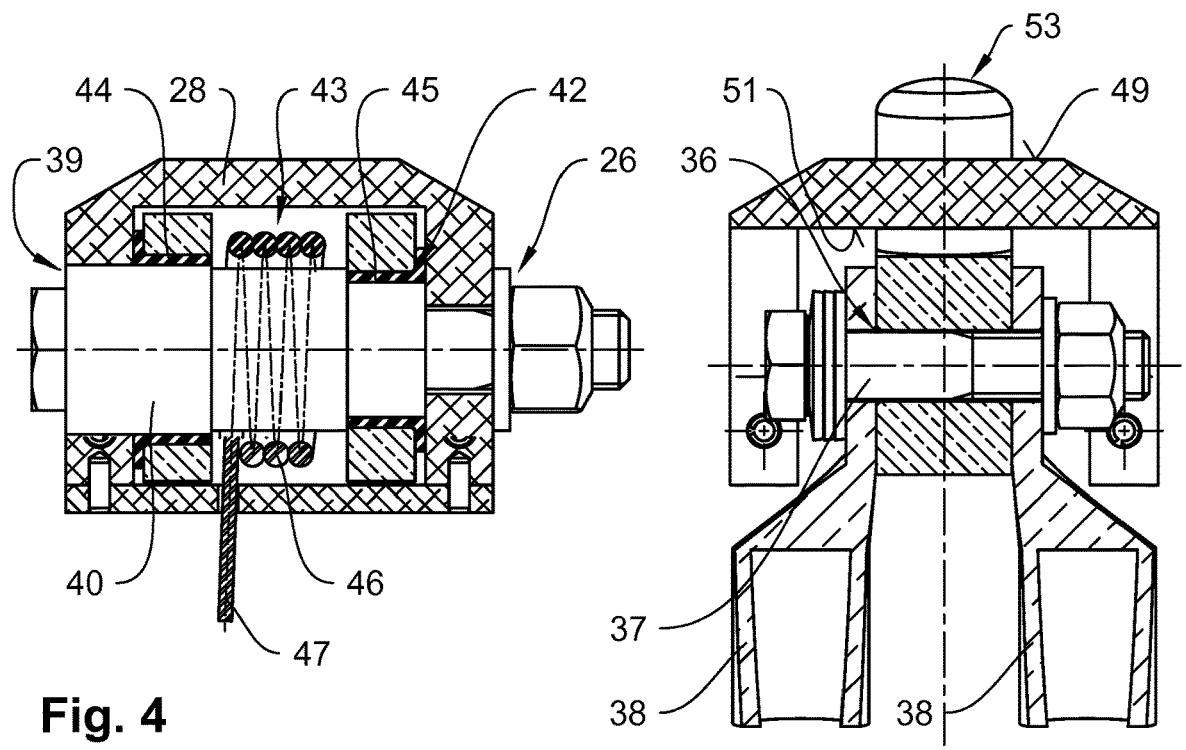
Fig. 4
Fig. 5

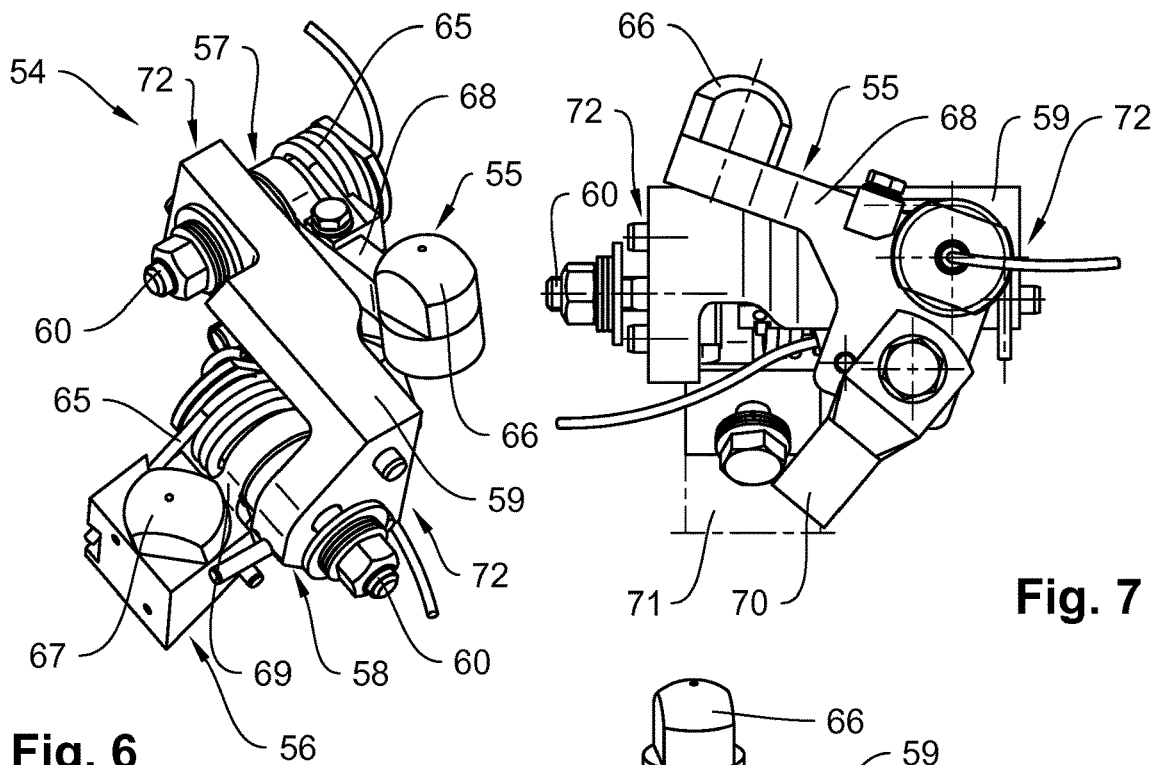
Fig. 6
Fig. 7
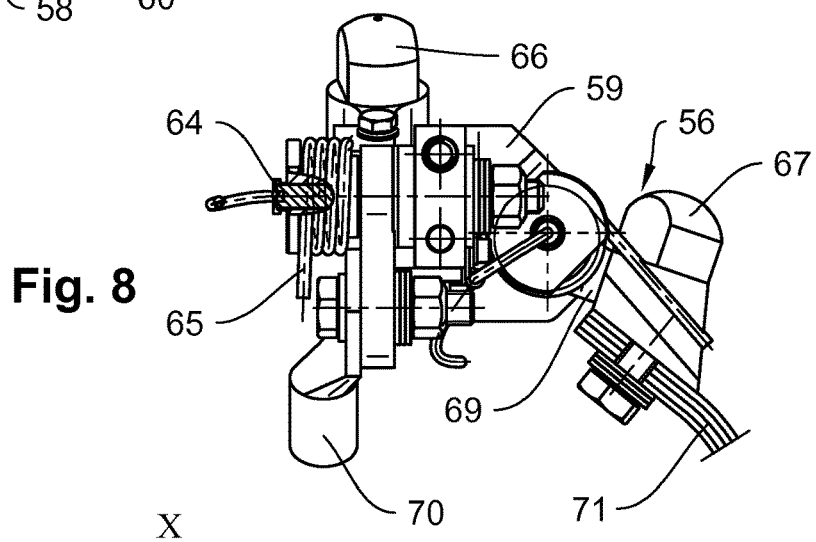
Fig. 8
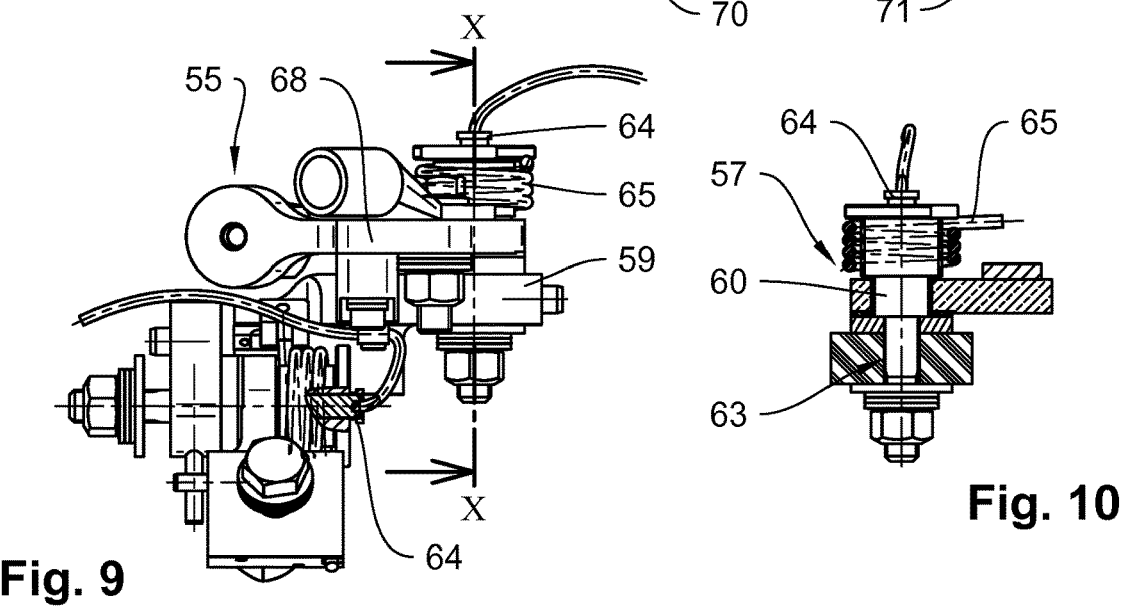
Fig. 9
Fig. 10

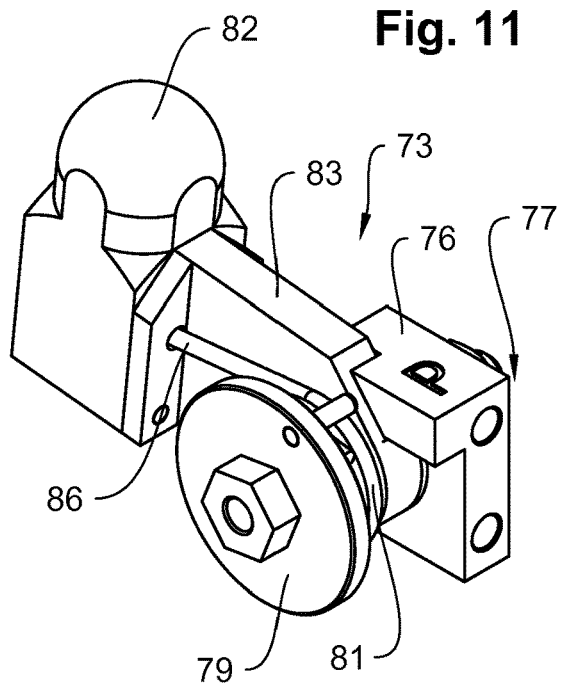
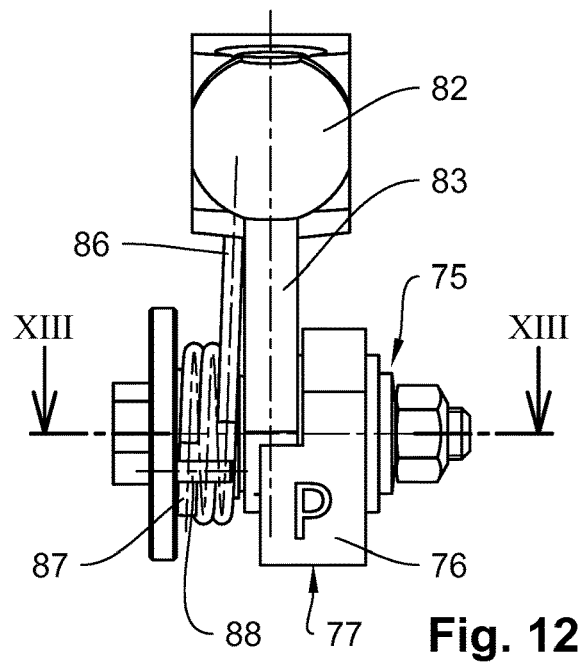
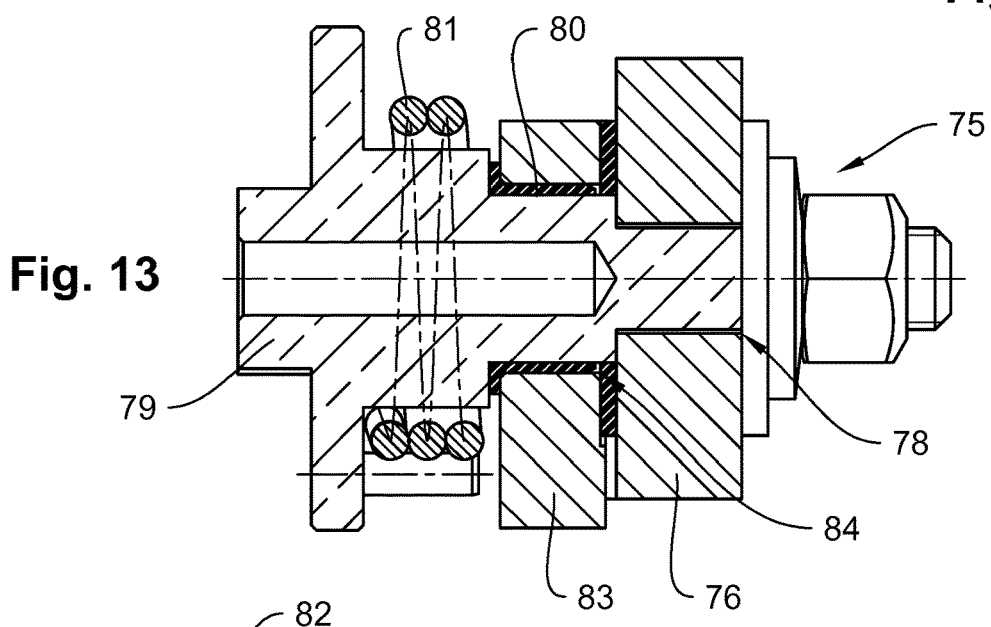
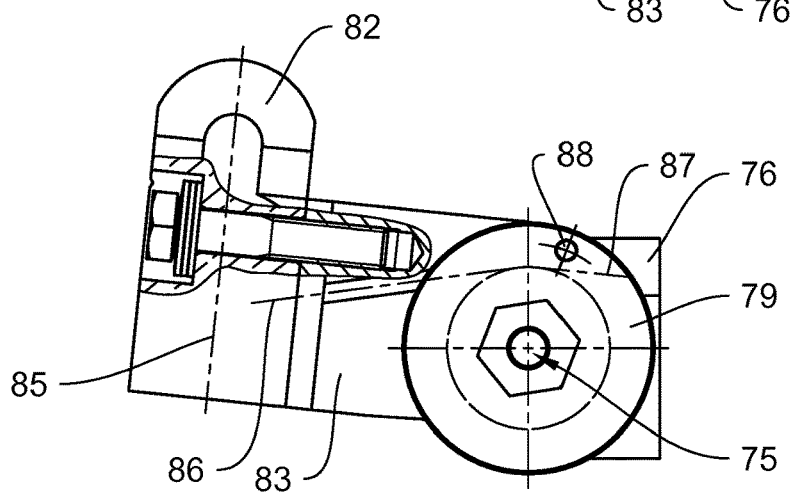

＃ CONTACT UNIT

TECHNICAL FIELD

The invention relates to a contact unit for a fast charging system for electrically driven vehicles, in particular electric busses or the like, the fast charging system comprising a charging contact device and a contact device having a contact unit carrier, the contact unit carrier having the contact unit, a charging contact of the charging contact device being electrically connectable to the contact unit to form a contact pair, the contact device or the charging contact device comprising a positioning device, the contact unit carrier being positionable relative to the charging contact device by means of the positioning device in such a manner that an electrically conductive connection is formed between a vehicle and a stationary charging station, the contact unit comprising a contact element, the contact unit having a connecting lead for being connected to the vehicle or the charging station.

BACKGROUND OF THE INVENTION

Contact units of this kind are known from the state of the art and are typically employed as a module of a contact device for fast charging of electrically driven vehicles at a bus stop or station. Electrically driven vehicles used in local transport, such as busses, can be continuously supplied with electrical energy via an overhead line, for example. However, this requires the presence and maintenance of an overhead line system. To be able to use the advantages of an electric drive without a network of overhead lines, it is known for means of transport to be equipped with batteries or other types of energy storages. Permanent operation of the means of transport can be ensured by fast-charging the batteries during a standstill of the means of transport at a stop.

From the state of the art, various fast charging systems for establishing an electrically conductive connection between a stationary charging station in the area of a bus stop and a vehicle or electric bus are known. For instance, what is known as a current collector having a contact strip may be disposed on a roof of an electric bus, a rail extending longitudinally in the direction of travel of the electric bus being suspended above a road in the area of the stop. When the electric bus stops at the stop, the current collector is lifted from the roof of the bus and moved against the rail, an electric connection being established for the duration of the planned stop of the electric bus at the stop, allowing fast charging for this period of time. In particular, however, two mutually independent current collectors and corresponding contact sections on the rail are required in order to be able to form a charging circuit.

Furthermore, contact elements for a control line, grounding or data transmission may be required, for example. In this case, a contact device of a current collector or fast charging system is provided with multiple contact elements which can be brought into contact with a corresponding number of charging contact elements which are disposed in the direction of travel of the electric bus and which may be formed by parallel rails, for example. Thus, a greater number of contact pairs can be formed.

From WO 2015/01887 A1, a fast charging system is known in which a matching contact unit carrier of a contact device is brought into contact with a roof-shaped charging contact device. The contact unit carrier is guided into a contact position by contact elements in the contact unit carrier being able to slide along the roof-shaped inclines of the charging contact device in such a manner that the contact unit carrier becomes centered in the charging contact device.

Each contact element is part of a contact unit which is permanently installed on the contact unit carrier. Each contact unit comprises a contact element guide within which the respective contact element is elastically mounted and displaceable in the direction of its longitudinal axis relative to the contact unit carrier. Thus, a potential angle offset during joining of the contact unit carrier and the charging contact device or a tilt of a bus at a bus stop due to changed load or a lowering of the bus can be compensated and safe contact establishment is ensured at all times. Each of the contact units is connected to the vehicle via one or more connecting leads. In particular, the connecting leads are screwed to the contact element guide by means of cable lugs. Hence, current is transmitted from, for example, an electrically conductive rail of the charging contact device to a contact element and from there, via a gap allowing the contact element to move in the contact element guide, to the contact element guide to which the connecting lead is connected.

Contact grease and a contact lamella or a multi-plate ring are used to establish a reliable current transmission from the contact element to the contact element guide. The disadvantage with this is that the contact unit carrier is exposed to environmental conditions such as snow, rain, dirt and dust, which can infiltrate at the contact element, i.e. the gap at the contact element, despite the use of a ring seal. In specific cases, this can cause the contact element to become blocked or wedged in the contact element guide, making contact establishment impossible or resulting in an undefined sequence of contacts being established, which is accompanied by the risk of an electric arc. To prevent failure in cold weather, a heating cartridge may be disposed at the contact element guide. Furthermore, it is known for contact elements to be plated with silver in order to favorably influence a transition resistance in the area of the contact element guide. If a contact unit fails, high currents will flow through the other contact units, which can lead to excessive heating and to failure of the entire fast charging system. Hence, the contact units have to be replaced or undergo maintenance at regular intervals so that a reliable contact establishment can be ensured.

SUMMARY OF THE INVENTION

Therefore, the object of the present invention is to propose a contact unit, a contact device comprising a contact unit, and a fast charging system that allow cost-effective operation of the means of transport and reliable contact establishment.

This object is attained by a contact unit having the features of claim 1, by a contact device having the features of claim 16 and by a fast charging system having the features of claim 21.

In the contact unit according to the invention for a fast charging system for electrically driven vehicles, in particular electric busses or the like, the fast charging system comprising a charging contact device and a contact device having a contact unit carrier, the contact unit carrier has the contact unit, a charging contact of the charging contact device being electrically connectable to the contact unit to form a contact pair, the contact device or the charging contact device comprising a positioning device, the contact unit carrier being positionable relative to the charging contact device by means of the positioning device in such a manner that an electrically conductive connection is formed between a vehicle and a stationary charging station, the contact unit comprising a contact element, the contact unit having a connecting lead for being connected to the vehicle or the charging station, the contact element being mounted on a pivot bearing of the contact unit so as to be pivotable relative to the contact unit carrier.

Because the contact element is mounted on the pivot bearing of the contact unit so as to be pivotable relative to the contact unit carrier, it is possible to easily ensure mobility of the contact element. Compared to contact element guides known of the state of the art, the risk that the contact element becomes stuck on the pivot bearing is significantly lower. Moreover, a pivot bearing is particularly simple to produce and can easily be protected against environmental conditions. On the whole, maintenance intervals for inspection and, if required, re-placement of the contact unit can be significantly extended, allowing the means of transport to be operated more cost-effectively. Furthermore, a blockage of the contact element is highly unlikely, allowing the fast charging system to be operated more reliably.

Advantageously, the contact element may be formed by a lever arm which is connected to the pivot bearing, said lever arm having a bolt-shaped contact bump, said bolt-shaped contact bump forming a contact surface for contacting the charging contact and being pivotable on the pivot bearing in the direction of its longitudinal axis. In that case, the contact element is particularly simple to produce and, for example, a point contact with a charging contact of a charging contact device can be established. It is also advantageous for the bolt-shaped contact element to have rounded edges or to be fully rounded at its contact end. In that case, the contact element can be moved along a charging contact without the charging contact or the contact element sustaining any major mechanical damage. Alternatively, the contact element can have any other suitable shape.

If the bolt-shaped contact bump is pivotable on the pivot bearing in the direction of its longitudinal axis, the longitudinal axis extends transversely at all times, preferably at an angle of 90° relative to the pivot bearing. The bolt-shaped contact bump can be formed such that the longitudinal axis is disposed in the manner of a tangent of a pivoting radius of the pivot bearing. The lever arm connects the contact bump to the pivot bearing. Furthermore, the contact element can be made of copper or a copper alloy and/or not be plated with silver. Copper is particularly suitable for a use in electrically conductive components, which is why the connecting lead may also be made of copper. In particular copper alloys have a comparatively high wear resistance and tarnish resistance. Since current does not have to be transmitted from a surface of the contact element to the pivot bearing, silver plating of the contact element can be entirely omitted, which reduces the production costs for the contact element substantially.

Also, the contact element can be formed in one piece or multiple pieces. The contact element can be produced from different materials which are suitable for the purpose intended. The contact element can also be formed in one piece and therefore be easy to install.

The connecting lead can be directly attached to the contact element. In contrast to contact elements having a contact element guide known from the state of the art, it is then no longer necessary to utilize a gap between the contact element guide and the contact element for transmitting currents. In this case, the connecting lead can also be moved together with the contact element. Furthermore, conductive greases or other components for facilitating current transmission in the area of a contact element guide or the pivot bearing are no longer necessary. A transition resistance between the connecting lead and the contact element can thus be decreased substantially.

The connecting lead can have a conductor cross section of at least 50 mm$^2$, preferably 95 mm$^2$. This allows the contact unit to transmit particularly high currents. In the contact units known from the state of the art, multiple connecting leads are screwed to a contact element guide via cable lugs. If the connecting lead is directly attached to the contact element, higher currents can be transmitted via the connecting lead, which is why a conductor cross section of this size can be selected. Undesired heating of the terminal lead can be prevented in this way. A cross-sectional shape of the terminal lead is basically arbitrary, which is why the terminal lead can also be a stranded wire band, for example. In principle, however, the connecting lead can be formed having any conductor cross section.

The pivot bearing can have a bearing bush made of a dielectric material on an axis of the pivot bearing. In principle, any material can be selected for the bearing bush, in which case the bearing bush can be made of aluminum, a plastic material or another dielectric material. This is possible because excessive heating of the contact unit in the area of the pivot bearing due to transition resistance is not to be expected if a connecting lead is directly attached to the contact element. A bearing bush can be made of a material having favorable sliding or sealing properties, such as PTFE. The axis of the pivot bearing can be formed particularly simply by a bolt or a screw. By using a bearing bush made of a dielectric material, it is also possible to electrically disconnect the contact element from the other components of the contact unit.

A spring of the contact unit can exert a spring force on the contact element, such that the contact element is pushed in the direction of a charging contact. The contact element can be elastically mounted using a simple compression spring, in particular a coil spring, on the contact element or in the area of the pivot bearing. As a result, a point contact with a charging contact can be established under spring pre-load. A spring force can be selected such that the contact element is pushed in the direction of the charging contact and into a front end position whenever the contact element is not in contact with a charging contact.

The spring can be a coiled torsion spring which can be mounted on an axis of the pivot bearing. The torsion spring can be coiled around the axis of the pivot bearing in the manner of a coil spring. Respective ends of the spring can be formed so as to be free in a radial direction such that the ends of the spring can be pivoted relative to each other around the axis while generating a spring force. An end of the torsion spring can be in contact with or fastened to the contact element, in which case a different end of the torsion spring can be fastened on the pivot bearing or on another component of the contact unit, for example a connecting element. This allows the contact element on the pivot bearing to be easily pivoted into an end position by means of the thus generated spring force.

The pivot bearing can have an electric resistance heating element. The electric resistance heating element can be formed in the manner of a heating bush or a heating cartridge, for example. A heating cartridge can be inserted into a hole within an axis of the pivot bearing or into a hole within a bearing housing of the pivot bearing in a simple manner. Thus, it is possible to effectively prevent the pivot bearing from freezing even at low temperatures.

The contact unit can comprise a connecting element, the contact element being disposable on the contact unit carrier by means of the connecting element and being connected to the connecting element via the pivot bearing. Accordingly, the pivot bearing having the connecting element can be attached to the contact unit carrier such that the contact element is pivotable on the contact unit carrier. In a particularly simple embodiment, the connecting element can be attachable to the contact unit carrier by means of a screw connection and form an axis onto which the contact element can easily be mounted. The axis can also be a screw which is inserted into a hole or passage opening in the connecting element.

The connecting element can also have a stop which limits a pivoting motion of the contact element relative to the contact unit carrier. For example, the stop can be a stepped diameter at the pivot bearing or a shoulder on the connecting element with which the contact element can come into contact. The stop can also simply be a bolt which is attached to the connecting element or the contact element. A pivoting motion of the contact element in the direction of a charging contact and/or in an opposite direction can be limited by means of the stop. Thus, a defined front end position and rear end position of the contact element on the pivot bearing can be limited.

In an advantageous embodiment, the connecting element can form a connecting bridge, two parallel side walls of the contact unit carrier being connectable by means of said connecting bridge. In this case, the connecting element does not only serve to mount the contact element, it also connects the side walls of the contact unit carrier as a component of said contact unit carrier. The connecting element can, for example, also be formed in the manner of a connecting longitudinal profile which is connected to the side walls at its opposite ends by means of pin and/or screw connections. An axis of the pivot bearing can be disposed parallel or orthogonally on the connecting element or the connecting bridge relative to the side walls.

Furthermore, the contact unit can have two contact elements which are each mounted on a pivot bearing so as to be pivotable relative to the contact unit carrier, both contact elements being mounted on the connecting element. In this case, the connecting element can be formed such that two pivot bearings are disposed or formed on the connecting element, in which case the pivot bearings can be disposed parallel relative to each other. Thus, it is also possible to substantially simplify the design of a contact unit carrier. It can also be envisaged that the respective contact elements are electrically decoupled from each other via the pivot bearings, in which case the connecting element itself can also be made of a dielectric material. This becomes possible in particular if each connecting lead is disposed directly on the respective contact element.

The pivot bearings can be disposed transversely to each other on the connecting element. The contact unit can thus be realized in an especially compact design. In particular, the pivot bearings can be disposed orthogonally relative to each other.

The contact unit can be configured in such a manner that a current of 500 A to 1,000 A, preferably of 800 A at a voltage of 750 V can be transmitted via the contact unit. Consequently, a power of 375 kW to 750 kW, preferably of 600 kW, can be transmitted via the contact unit.

Hence, a single connecting lead for connection to the contact element may suffice. Also, the vehicle can be charged faster because higher currents can be transmitted in less time. If applicable, the number of contact units on a contact unit carrier may even be reduced, making production of the contact device more cost-effective.

The contact device according to the invention has a contact unit according to the invention. The contact device can also have a plurality of contact units for different phases, grounding, or data transmission, for example.

The positioning device can have a pantograph or a pole by means of which the contact unit carrier can be positioned in at least the vertical direction relative to the charging contact unit, and the contact device can be disposed on a vehicle or on a charging station. In the case of a pole, an additional linkage may be provided, which stabilizes the contact unit carrier relative to a charging contact device or aligns it in the respective direction. A pantograph or a pole or a corresponding mechanical drive is particularly simple and cost-effective to produce. Additionally, the positioning device may also have a transverse guide by means of which the contact unit carrier can be positioned in the transverse direction relative to the charging contact device or to a direction of travel of the vehicle. The transverse guide can be disposed on a vehicle or on a pantograph or pole of the positioning device. In both cases, the positioning device or a contact unit carrier disposed on the positioning device can be displaced transverse to the direction of travel of the vehicle. This displaceability allows an imperfect position of the vehicle at a station to be compensated transverse to the direction of travel. Moreover, potential vehicle movements due to one-sided lowering of the vehicle for people entering and exiting can be compensated in such a manner that the contact unit carrier relative to the charging contact device cannot shift in the transverse direction. The contact device can be disposed on a vehicle roof, for example, allowing the contact unit carrier to be moved from the vehicle roof toward the charging contact device and back by means of the positioning device. Alternatively, the contact device can be disposed on the charging station, in which case the contact unit carrier can be moved from a support, such as a pole or a bridge, at a bus stop in the direction of a vehicle roof having a charging contact device and back.

At least two contact elements can protrude at different heights relative to a surface of the contact unit carrier, said surface facing the charging contact unit. During the establishment of at least two contact pairs between a contact element and a charging contact each, this allows a defined sequence in the production of contact pairs to be ensured. When the contact unit carrier and the charging contact device are being joined, a sequence of contacts is maintained by design at all times and ensured by the geometric arrangement of the contact elements relative to the surface of the contact unit carrier. Unintentional or erroneous contact establishment or formation of contact pairs can easily be prevented in this way.

The contact unit carrier can have a body having passage openings. Accordingly, the body can be formed open, meaning air can flow through it. If the body has a number of passage openings, the contact elements which are disposed on the body can simply be cooled by air, such that undesired heating of the contact elements as a result of power transmission during a charging process can be prevented in a simple manner. Furthermore, the body and thus the contact unit carrier can be formed having less weight.

The body can be formed by two parallel side walls made of a dielectric material, the side walls being connected to each other by means of connecting bridges.

The body can be made of a plastic material, for example, and the parallel side walls can also be made of a fiber-reinforced plastic material. In this case, production of the side walls is particularly simple and cost-effective and the side walls produced are particularly stable. The body can be formed by connecting the side walls via the connecting bridges. The connecting bridges define a relative distance of the side walls and can be screwed to the side walls, for example. The connecting bridges can also be made of a plastic material or of metal and can be simple rectangular strips. Passage openings into which a contact unit can be inserted and attached as needed can be formed within the connecting bridges. The contact units and the connecting bridges do not require any special electrical insulation if the side walls are made of the dielectric material.

Other advantageous embodiments of a contact device are apparent from the claims dependent on claim 1.

The fast charging system according to the invention has a charging contact device and a contact device according to the invention.

The charging contact device can form a receiving opening for the contact unit carrier, in which case the contact unit carrier can be insertable into the receiving opening of the charging contact device. The receiving opening can preferably be V-shaped. In case of a relative offset of the contact unit carrier from the receiving opening during joining of the contact unit carrier and the charging contact device, the V-shaped design of the receiving opening centers the contact unit carrier. Hence, the receiving opening forms a guide for the contact unit carrier, which can compensate an offset from a contact position on the charging contact device.

The contact unit carrier can alternatively form a receiving opening for the charging contact device, in which case the charging contact device can be insertable into the receiving opening of the contact unit carrier. In this case, the receiving opening can preferably also be V-shaped. In this case, the receiving opening also forms a guide for the charging contact device.

The charging contact device and/or a transverse guide of the positioning device can have an electric resistance heating element. By heating the charging contact device by means of the electric resistance heating element, deposits of frost, ice or snow on the charging contact device can be prevented, for example. The electric resistance heating element can also be used to heat the transverse guide of the positioning device, such that it is ensured at all times that the transverse guide can be moved even at low temperatures and is prevented from freezing.

Advantageous embodiments of the fast charging system are apparent from the claims dependent on claims 16 to 20.

In principal, the invention is applicable to any type of electric vehicle that is battery-operated and has to be recharged.

Hereinafter, preferred embodiments of the invention will be explained in more detail with reference to the accompanying drawings.

BRIEF DESCRIPTION OF THE DRAWING FIGURES

Figure 2:
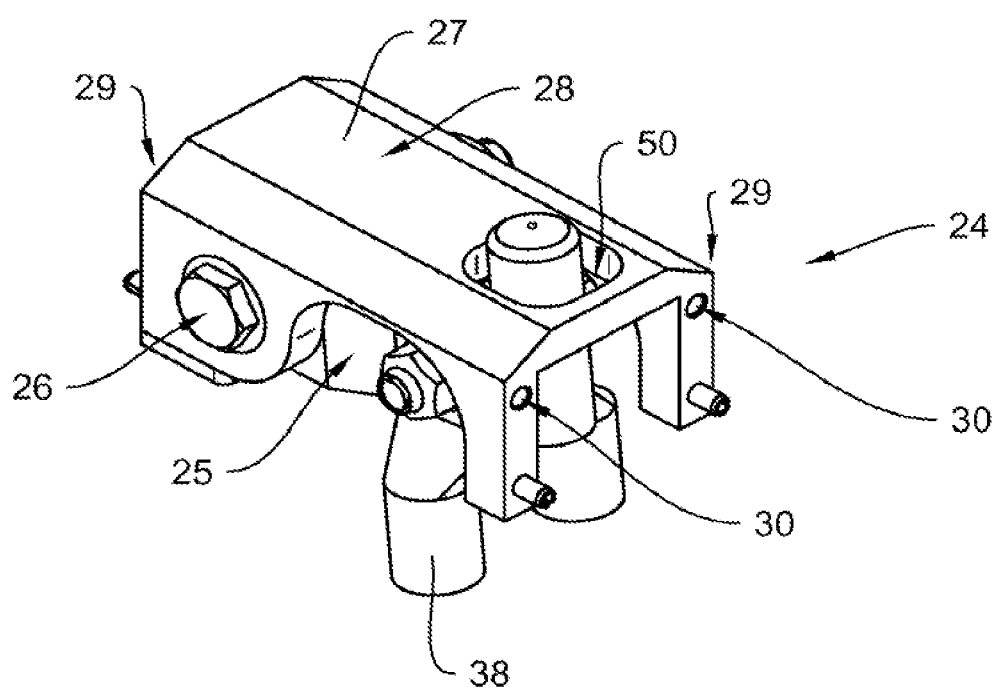

FIG. 1 is a side view of a contact unit carrier according to the state of the art;
FIG. 2 is a perspective view of a first embodiment of a contact unit;
FIG. 3 is a side view of the contact unit of FIG. 2;
FIG. 4 a sectional view along a line IV-IV of FIG. 3;
FIG. 5 a sectional view along a line V-V of FIG. 3;
FIG. 6 is a perspective view of a second embodiment of a contact unit;
FIG. 7 is a side view of the contact unit of FIG. 6;
FIG. 8 is a back view of the contact unit of FIG. 6;
FIG. 9 is a bottom view of the contact unit of FIG. 6;
FIG. 10 is a sectional view along a line X-X of FIG. 9;
FIG. 11 is a perspective view of a third embodiment of a contact unit;
FIG. 12 is a top view of the contact unit of FIG. 11;
FIG. 13 is a sectional view along a line XIII-XIII of FIG. 12;
FIG. 14 is a side view of the contact unit of FIG. 11.

DETAILED DESCRIPTION OF THE INVENTION

FIG. 1 shows a contact unit carrier 10 as known from the state of the art. Contact unit carrier 10 is part of a contact device (not shown) and is disposed on a positioning device of the contact device, allowing contact unit carrier 10 to be displaced relative to and brought into contact with a charging contact device (not shown). Contact unit carrier 10 is composed of a body 11 having contact units 12, 13 and guide elements 14 for attaching it to a transverse guide of the positioning device. Contact units 12 and 13 each have a contact element 15, contact element guides 16 and 17, respectively, and connecting leads 18. The connecting leads are formed by conductors 19 having cable lugs 20, cable lugs 20 being screwed to contact element guides 16 and 17, respectively, to establish an electrical connecting contact. Contact elements 15 are displaceable in the direction of their longitudinal axis 21 in the contact element guide 16, protrude beyond a surface 22 of housing 11 and are subject to a spring force. To form a contact pair, a contact end 23 is brought into contact with a charging contact of the charging contact device, contact element 15 being pushed a little into contact element guide 16. Current is transmitted from the charging contact to contact element 15 and from there to contact element guides 16 and 17, respectively, which, in turn, are connected to connecting lead 18. In particular, two connecting leads 18 are attached to contact element guides 17 in order to be able to transmit high currents via connecting leads 18.

A combined view of FIGS. 2 to 5 shows a contact unit 24 which is attachable to a body (not shown) of a contact unit carrier. Contact unit 24 comprises a contact element 25, a pivot bearing 26 and a connecting element 27, which forms a connecting bridge 28. Connecting element 27 has holes 30 on its respective ends 29 for being connected to side walls (not shown). Contact element 25 is formed by a lever arm 31 and a bolt-shaped contact bump 32. Contact bump 32 is mounted so as to be pivotable on pivot bearing 26 in the direction of its longitudinal axis 33 and can contact a charging contact (not shown) of a charging contact device by means of a surface 34 on a contact end 35 of contact bump 32.

Lever arm 31 has a passage opening 36, into which a screw 37 is inserted for clamping cable lugs 38 of connecting leads (not shown) on contact element 25. Furthermore, a passage opening 39 is formed in connecting element 27, an axis 40 of pivot bearing 26 being inserted into passage opening 39 and being attached by screwing. Lever arm 31 also has a passage opening 42 on an end 41 which is averted from contact bump 32 and a groove 43 extending transversely to passage opening 42. Bearing shells 44 and 45 are disposed on axis 40 in such a manner that lever arm 31 or contact element 25 is pivotable mostly free of play on pivot bearing 26. A spring 46 of contact unit 24 is disposed within groove 43 and surrounds axis 40, one spring end 47 being in contact with connecting element 27 and another spring end 48 being in contact with lever arm 31 within groove 43 (as indicated), thus exerting a spring force onto lever arm 31 by means of a pre-load of spring 46.

A passage opening 50 for contact bump 32 is formed in an upper surface 49 within connecting element 27 such that contact bump 32 protrudes beyond upper surface 49. A lower surface 51 of connecting element 27 in the area of passage opening 50 in this case serves as a stop 52 for limiting upper end position 53 (as shown) of contact element 25. If contact element 25 or contact bump 32 is contacted with a charging contact (not shown), contact bump 32 is pushed into passage opening 50 against the spring force of spring 46 and is thereby pivoted around pivot bearing 26.

A combined view of FIGS. 6 to 10 shows a contact unit 54 having contact elements 55 and 56, pivot bearings 57 and 58 and a connecting element 59. Pivot bearings 57 and 58 are each formed by means of a screw 60 on connecting element 59, screw 60 forming an axis 63 of pivot bearings 57 and 58. An electric resistance heating element 64 is inserted into axis 63 for heating pivot bearings 57 and 58. Furthermore, axis 63 is surrounded by spring 65. Contact elements 55 and 56 each comprise a bolt-shaped contact bump 66 and 67, respectively, and lever arms 68 and 69, respectively, which are attached to pivot bearings 57 and 58, respectively, by means of screws 60. A cable lug 70 of a connecting lead (not shown) is directly attached to contact element 55 and a stranded wire band 71 is directly attached to contact element 56. Furthermore, ends 72 of connecting element 59 can be attached to side walls (not shown) of a body of a contact device.

A combined view of FIGS. 11 to 14 shows a contact unit 73 which is formed by a contact element 74, a pivot bearing 75 and a connecting element 76. In this case, end 77 of connecting element 76 is attachable to a side wall (not shown) of a body of a contact unit carrier or of a contact device. A passage opening 78 is formed in connecting element 76, an axis 79 of pivot bearing 75 being inserted and screwed into passage opening 78. A bearing shell 80 and a spring 81 are disposed on axis 79. In this case, contact element 74 is formed in two pieces by a bolt-shaped contact bump 82 and a lever arm 83 which are screwed to each other. Lever arm 83 also has a passage opening 84 and lever arm 83 is mounted on bearing shell 80 by passage opening 84. Thus, bolt-shaped contact bump 82 is pivotable around pivot bearing 75 in the direction of its longitudinal axis 85. A spring end 86 of spring 81 is in contact with or attached to lever arm 83, another spring end 87 being attached to a bolt 88 of axis 79. In this case, a spring force acting on lever arm 83 and thus in the direction of longitudinal axis 85 can be exerted by means of a pre-load of spring 81.

The invention claimed is:

1. A contact unit (24, 54, 73) for a fast charging system for electrically driven vehicles, in particular electric busses, the fast charging system comprising:
    a charging contact device and a contact device having a contact unit carrier, the contact unit carrier having the contact unit, a charging contact of the charging contact device being electrically connectable to the contact unit to form a contact pair, the contact device or the charging contact device comprising a positioning device, the contact unit carrier being positionable relative to the charging contact device by means of the positioning device in such a manner that an electrically conductive connection is formed between a vehicle and a stationary charging station, the contact unit comprising a contact element (25, 55, 56, 74), the contact unit having a connecting lead (38, 70, 71) for being connected to the vehicle or the charging station, characterized in that the contact element is mounted on a pivot bearing (26, 57, 58, 75) of the contact unit so as to be pivotable relative to the contact unit carrier.

2. The contact unit according to claim 1, characterized in that the contact element (25, 55, 56, 74) is formed by a lever arm (31, 68, 69, 83) which is connected to the pivot bearing (26, 57, 58, 75), said lever arm (31, 68, 69, 83) having a bolt-shaped contact bump (32, 66, 67, 82), said bolt-shaped contact bump forming a contact surface (34) for contacting the charging contact and being pivotable on the pivot bearing in the direction of its longitudinal axis (33, 85).

3. The contact unit according to claim 1, characterized in that the contact element (25, 55, 56, 74) is formed in one piece or multiple pieces.

4. The contact unit according to claim 1, characterized in that the connecting lead (38, 70, 71) is directly attached to the contact element (25, 55, 56, 74).

5. The contact unit according to claim 1, characterized in that the connecting lead (38, 70, 71) has a conductor cross section of at least 50 mm2.

6. The contact unit according to claim 1, characterized in that the pivot bearing (26, 57, 58, 75) has a bearing bush (44, 45, 80) made of a dielectric material on an axis (40, 63, 79) of the pivot bearing.

7. The contact unit according to claim 1, characterized in that a spring (46, 65, 81) of the contact unit (24, 54, 73) exerts a spring force on the contact element (25, 55, 56, 74), such that the contact element is pushed in the direction of a charging contact.

8. The contact unit according to claim 7, characterized in that the spring (46, 65, 81) is a coiled torsion spring, which is mounted on an axis (40, 63, 79) of the pivot bearing (26, 57, 58, 75).

9. The contact unit according to claim 1, characterized in that the pivot bearing (26, 57, 58, 75) has an electric resistance heating element (64).

10. The contact unit according to claim 1, characterized in that the contact unit (24, 54, 73) comprises a connecting element (27, 59, 76), the contact element (25, 55, 56, 74) being disposable on the contact unit carrier by means of the connecting element, the contact element being connected to the connecting element via the pivot bearing (26, 57, 58, 75).

11. The contact unit according to claim 10, characterized in that the connecting element (27, 59, 76) has a stop (52) which limits a pivoting motion of the contact element (25, 55, 56, 74) relative to the contact unit carrier.

12. The contact unit according to claim 10, characterized in that the connecting element (27, 59, 76) forms a connecting bridge (28), two parallel side walls of the contact unit carrier being connectable by means of said connecting bridge.

13. The contact unit according to claim 10, characterized in that the contact unit (24, 54, 73) has two contact elements (25, 55, 56, 74) which are each mounted on a pivot bearing (26, 57, 58, 75) so as to be pivotable relative to the contact unit carrier, both contact elements being mounted on the connecting element (27, 59, 76).

14. The contact unit according to claim 10, characterized in that the pivot bearings (56, 57, 58, 75) are disposed transversely to each other on the connecting element (27, 59, 76).

15. The contact unit according to claim 1, characterized in that the contact unit (24, 54, 73) is configured in such a manner that a current of 500 A to 1000 A at a voltage of 750 V is transmittable via the contact unit.

16. A contact device having a contact unit (24, 54, 73) according to claim 1.

17. The contact device according to claim 1, characterized in that the positioning device has a pantograph or a pole by means of which the contact unit carrier is positionable in at least the vertical direction relative to the charging contact unit, the contact device being disposable on a vehicle or on a charging station.

18. The contact device according to claim 16, characterized in that at least two contact elements (25, 55, 56, 74) protrude at different heights relative to a surface (49) of the contact unit carrier, said surface (49) facing the charging contact unit.

19. The contact device according to claim 16, characterized in that the contact unit carrier has a body having passage openings.

20. The contact device according to claim 19, characterized in that the body is formed by two parallel side walls made of a dielectric material, the side walls being connected to each other by means of connecting bridges (28).

21. A fast charging system comprising a charging contact device and a contact device according to claim 16.

22. The fast charging system according to claim 21, characterized in that the charging contact device forms a receiving opening for the contact unit carrier, the contact unit carrier being insertable into the receiving opening of the charging contact device.

23. The fast charging system according to claim 21, characterized in that the contact unit carrier forms a receiving opening for the charging contact device, the charging contact device being insertable into the receiving opening of the contact unit carrier.

24. The fast charging system according to claim 21, characterized in that the charging contact device and/or a transverse guide of the positioning device have an electric resistance heating element.

* * * * *